(12) United States Patent
Takebayashi et al.

(10) Patent No.: US 8,779,888 B2
(45) Date of Patent: Jul. 15, 2014

(54) COMMUNICATION APPARATUS AND COMMUNICATION APPARATUS CONTROL METHOD

(75) Inventors: Ken Takebayashi, Kawasaki (JP); Nobuko Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/461,514

(22) Filed: Aug. 13, 2009

(65) Prior Publication Data
US 2009/0306793 A1 Dec. 10, 2009

Related U.S. Application Data

(63) Continuation of application No. PCT/JP2007/056919, filed on Mar. 29, 2007.

(51) Int. Cl.
*G05B 19/02* (2006.01)
(52) U.S. Cl.
USPC ............. 340/4.32; 340/3.1; 340/3.5; 340/3.7; 340/10.1
(58) Field of Classification Search
USPC ..................................... 340/825.22
See application file for complete search history.

(56) References Cited

U.S. PATENT DOCUMENTS

| | | | | | |
|---|---|---|---|---|---|
| 5,410,292 | A | * | 4/1995 | Le Van Suu | 370/479 |
| 6,523,696 | B1 | * | 2/2003 | Saito et al. | 709/223 |
| 6,701,430 | B1 | | 3/2004 | Iwamoto | |
| 7,081,830 | B2 | | 7/2006 | Shimba et al. | |
| 7,096,011 | B2 | * | 8/2006 | Kanazawa et al. | 455/421 |
| 7,673,030 | B2 | * | 3/2010 | Hite et al. | 709/223 |
| 2003/0061380 | A1 | | 3/2003 | Saito et al. | |
| 2003/0217136 | A1 | | 11/2003 | Cho et al. | |
| 2004/0148379 | A1 | * | 7/2004 | Ogura | 709/223 |
| 2006/0122712 | A1 | | 6/2006 | Sugiyama | |
| 2006/0174102 | A1 | | 8/2006 | Smith et al. | |
| 2007/0297426 | A1 | * | 12/2007 | Haveson et al. | 370/401 |

(Continued)

FOREIGN PATENT DOCUMENTS

| | | |
|---|---|---|
| JP | 2000-312215 | 11/2000 |
| JP | 2003-259463 | 9/2003 |

(Continued)

OTHER PUBLICATIONS

International Search Report for PCT/JP2007/056919, mailed Jul. 3, 2007.

(Continued)

*Primary Examiner* — Benjamin C. Lee
*Assistant Examiner* — Curtis King
(74) *Attorney, Agent, or Firm* — Fujitsu Patent Center

(57) ABSTRACT

A communication system is installed in information home appliances controlled by an operation system connected to an IP network. The communication system includes a first communication apparatus connected to the IP network; and a second communication apparatus connected to the first communication apparatus. The first communication apparatus includes a determining unit for determining, based on an attribute included in a search signal transmitted from the second communication apparatus in order to search for the first communication apparatus, whether the first communication apparatus can control the second communication apparatus; a search-signal response signal generating unit for generating and transmitting, to the second communication apparatus, a response signal in response to the search signal in the case the determination of the determining unit is affirmative; and a registering unit for registering the second communication apparatus as a control target based on a connection request made by the second communication apparatus.

5 Claims, 10 Drawing Sheets

(56) References Cited

U.S. PATENT DOCUMENTS

| | | | |
|---|---|---|---|
| 2008/0010374 A1* | 1/2008 | Lim et al. | 709/225 |
| 2008/0127168 A1* | 5/2008 | Tremblay et al. | 717/174 |
| 2009/0178040 A1* | 7/2009 | Cho | 718/100 |

FOREIGN PATENT DOCUMENTS

| | | |
|---|---|---|
| JP | 2004-040285 | 2/2004 |
| JP | 2006-033135 | 2/2006 |
| JP | 2006-106974 | 4/2006 |
| JP | 2006-155329 | 6/2006 |

OTHER PUBLICATIONS

Extended European Search Report dated Sep. 9, 2011 for corresponding European Application No. 07740357.4.

Bogers, Gertjan, "UPnP—JXTA Bridging", Jun. 30, 2004, pp. 1-87, www.win.tue.nl/~mtjiong/EES5413/UPnP-JXTA%20Bridging%20v2.1.pdf.

Park, J. H., et al., "COBRA-based distributed and replicated resource repository architecture for hierarchically configurable home network", Journal of Systems Architecture, vol. 51, No. 2, Dec. 15, 2004, pp. 125-142.

* cited by examiner

COMMUNICATION APPARATUS AND COMMUNICATION APPARATUS CONTROL METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2007/056919, filed on Mar. 29, 2007, the entire contents of which are incorporated herein by reference.

FIELD

The present disclosure is directed to an information home appliance connected to an IP network and an operation system for controlling the information home appliance. In particular, the present disclosure is directed to a communication apparatus installed in an information home appliance which is controlled by an operation system, and also directed to a communication apparatus control method.

BACKGROUND

There are operation systems for controlling information home appliances which are connected to IP (internet protocol) communication networks. For example, an information home appliance connected to an IP communication network is controlled by an operation system via a communication apparatus installed in the information home appliance. Here, information home appliances refer to digitalized and networked apparatuses and services, and specifically to information and telecommunications equipment and household electrical products used in various situations in daily life, such as mobile phones, personal digital assistances (PDA) and automotive TVs. An operation system transmits control information to individual communication apparatuses connected to an IP communication network, thereby causing information home appliances having the communication apparatuses to execute their functions.

As for systems for controlling information home appliances connected to an IP communication network, a system has been disclosed in which a television being one of home network-connected appliances and having a network communication function for executing an Internet browser is used to operate other home network-connected appliances (see Patent Document 1, for example).

Another information home appliance control system has been disclosed in which an information home appliance can control another appliance without being aware of a difference in control system, even if the appliance to be controlled has a different control system (see Patent Document 2, for example).

[Patent Document 1] Japanese Laid-open Patent Application Publication No. 2006-106974
[Patent Document 2] Japanese Laid-open Patent Application Publication No. 2003-259463

DISCLOSURE OF THE INVENTION

However, the conventional technologies described above have the following problems.

A communication apparatus installed in each information home appliance and the IP communication network are connected via a router having an address conversion function. In order to allow an operation system connected to the IP communication network to arbitrarily establish a peer-to-peer connection with each communication apparatus, the operation system needs to obtain connection information of all communication apparatuses to be under control, for example, attributes and IP addresses of information home appliances in which the communication apparatuses are installed, and perform control individually on a control-target communication apparatus.

Specifically, an operation system 10 includes a client PC 2 and a server 4, as illustrated in FIG. 1. The operation system 10 is connected to communication apparatuses 20 (20$_1$, 20$_2$, and 20$_3$) via a network 50. According to the example of FIG. 1, the communication apparatuses 20 are installed in air conditioners. In the case where the operation system 10 and the communication apparatuses 20 are connected via an IP communication network, information indicating connection statuses of the individual communication apparatuses 20 is stored in the server 4, in addition to attributes and IP addresses of the communication apparatuses 20.

In the case where multiple information home appliances are controlled by the operation system 10, control instructions to the multiple information home appliances are input from the client PC 2, and the instructions are then transmitted to the server 4. According to the received control instructions, the server 4 needs to obtain connection information of all the information home appliances and perform control over individual communication apparatuses installed in control-target information home appliances. This causes the following problems.

The server 4 needs to obtain the connection information of all the communication apparatuses. Since connection information that the server 4 can obtain is limited, the server 4 would experience difficulty in handling home appliances in connection if the number of them increases. In addition, the server 4 needs to be connected to the individual communication apparatuses of the information home appliances, which presents high network load. Furthermore, a security policy, such as a firewall, is necessary for each connection between the server 4 and the individual communication apparatuses.

SUMMARY

The communication system of the present disclosure is to be installed in information home appliances that are controlled by an operation system connected to an IP network. The communication system includes a first communication apparatus connected to the IP network; and a second communication apparatus connected to the first communication apparatus. The first communication apparatus includes a determining unit configured to determine, based on an attribute included in a search signal transmitted from the second communication apparatus in order to search for the first communication apparatus, whether the first communication apparatus is able to control the second communication apparatus; a search-signal response signal generating unit configured to generate and transmit, to the second communication apparatus, a response signal in response to the search signal in the case where the first communication apparatus is determined to be able to control the second communication apparatus; and a registering unit configured to register the second communication apparatus as a control target based on a connection request made by the second communication apparatus after receiving the response signal.

The object and advantages of the disclosure will be realized and attained by means of the elements and combinations particularly pointed out in the claims.

DESCRIPTION OF EMBODIMENTS

Figure 1:
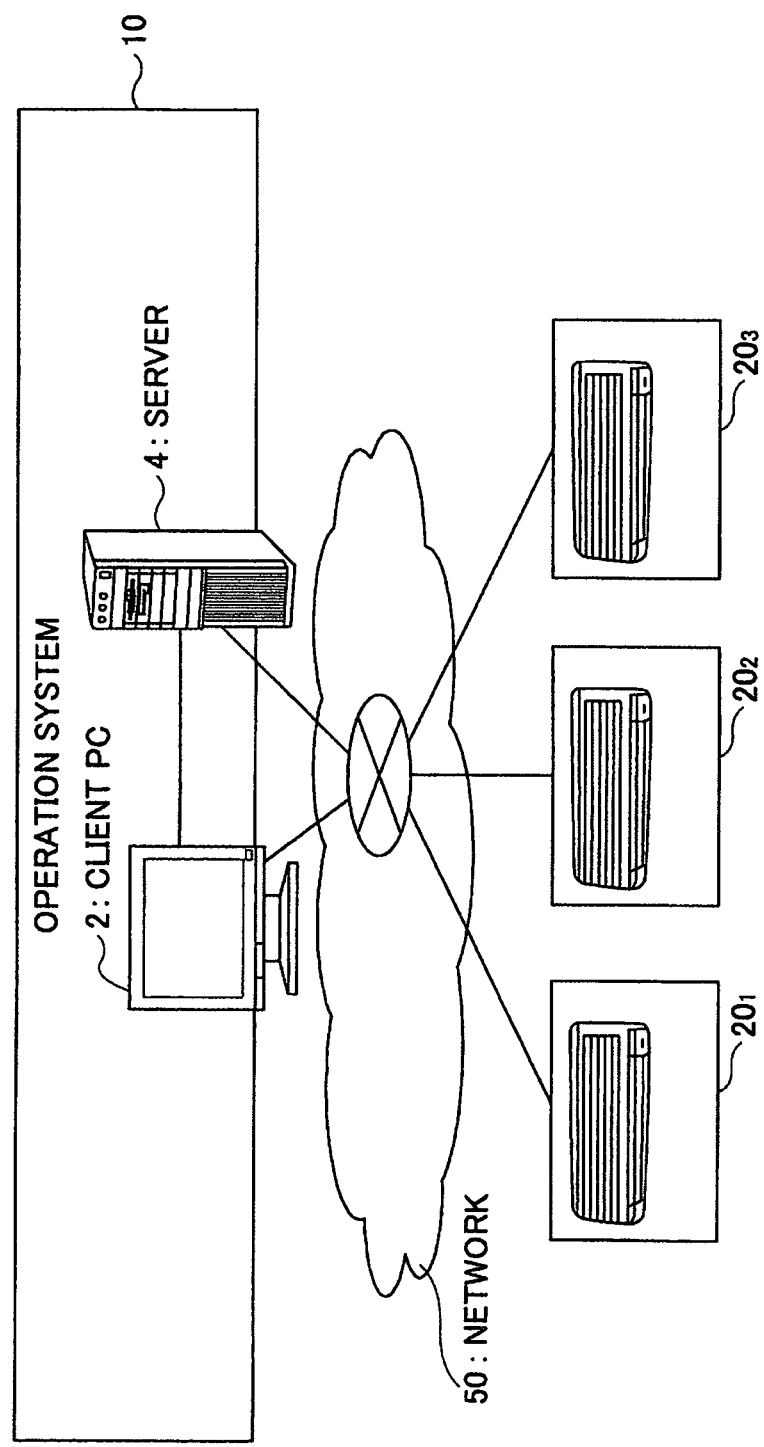
FIG. 1 illustrates an operation system used for controlling information home appliances connected to an IP network.

Embodiments that describe the best mode for carrying out the present disclosure are explained next with reference to the drawings.

In all drawings illustrating the embodiments, the same reference numerals are given to components having the identical functions, and their repeated explanations are omitted.

Figure 2:
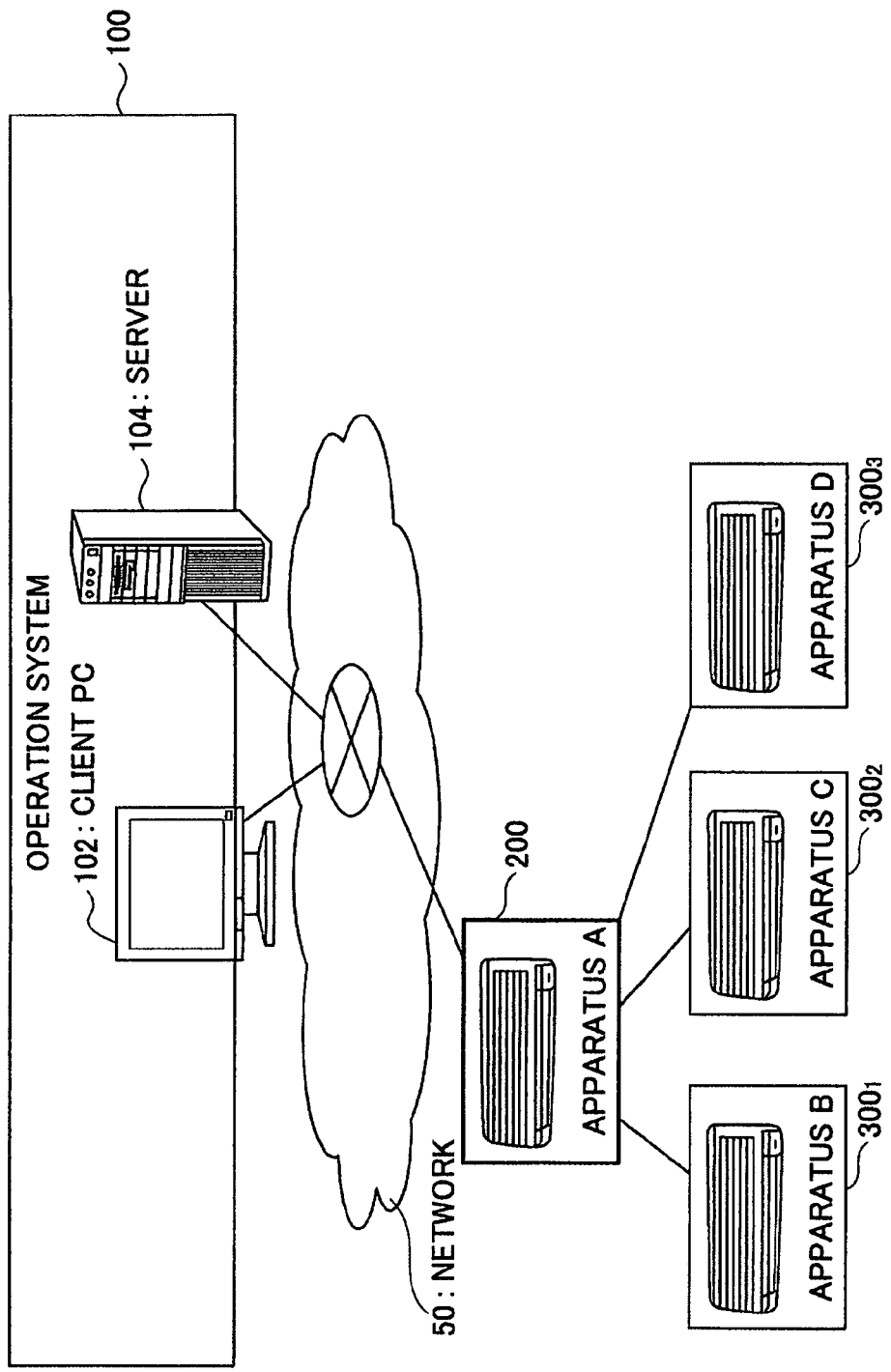
FIG. 2 illustrates an operation system used for controlling information home appliances connected to an IP network according to one embodiment of the present disclosure.

An information home appliance control system according to one embodiment of the present disclosure is described next with reference to FIG. 2.

The information home appliance control system of the present embodiment includes an operation system 100; a communication apparatus 200 (hereinafter, referred to as "head parent apparatus") connected to the operation system 100 via a network 50; and communication apparatuses 300 ($300_1$, $300_2$ and $300_3$) ("child apparatuses") connected to the head parent apparatus 200. Although the present embodiment is described using a case in which communication apparatuses are installed in air conditioners, which are examples of information home appliances, the communication apparatuses may be installed in appliances other than air conditioners.

The operation system 100 includes, for example, a client PC 102 used to input a control instruction directed to a communication apparatus; and a server 104 that is connected to the client PC 102 and controls the head parent apparatus 200 connected to the IP communication network 50 according to a control instruction input from the client PC 102. The head parent apparatus 200 and the server 104 are connected via a router. The head parent apparatus 200 and the child apparatuses 300 form, for example, a mesh network.

Figure 3:
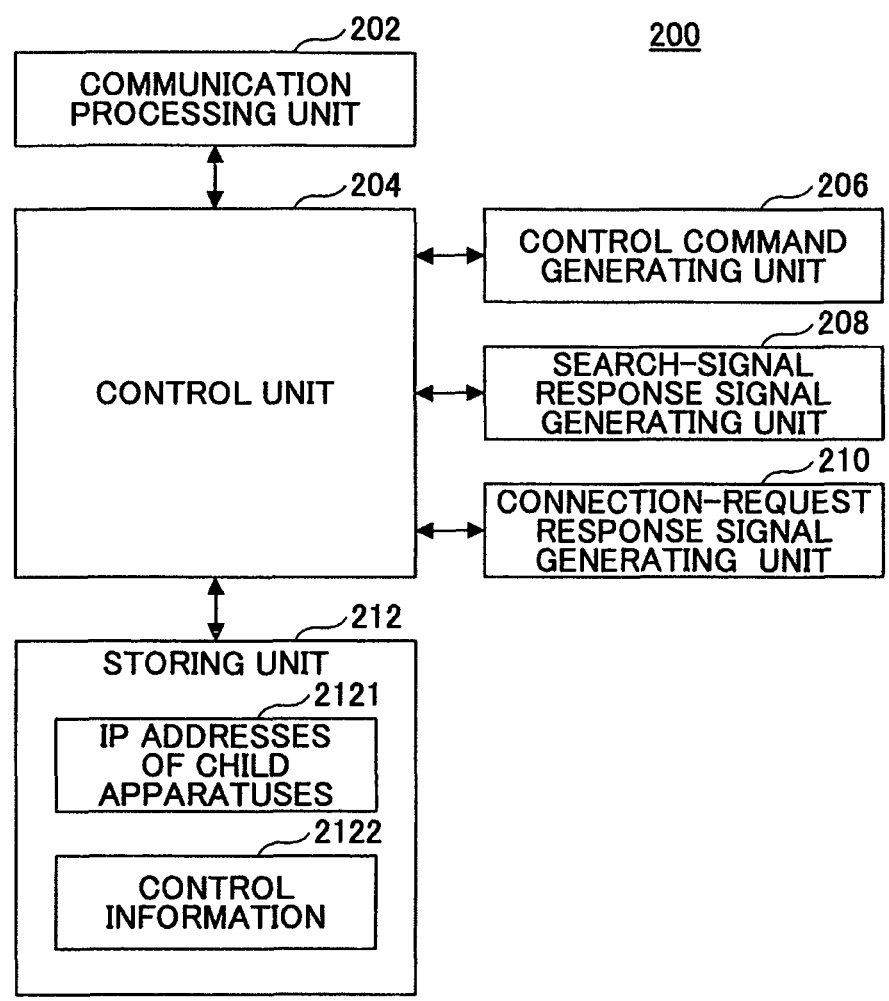
FIG. 3 is a block diagram showing a communication apparatus installed in an information home appliance according to one embodiment of the present disclosure.

The head parent apparatus 200 is described next with reference to FIG. 3.

The head parent apparatus 200 includes a communication processing unit 202, a control unit 204, a control command generating unit 206, a search-signal response signal generating unit 208, a connection-request response signal generating unit 210 and a storing unit 212. In the storing unit 212, IP addresses 2121 of the child apparatuses and control information 2122 are stored.

The head parent apparatus 200 has a function of managing multipoint connections. The multipoint connection managing function achieves registering IP addresses of the child apparatuses 300 based on connection requests transmitted from the individual child apparatuses 300 and transmitting, to a corresponding child apparatus among the registered child apparatuses, a control command transmitted from the server 104. That is, only the head parent apparatus 200 is connected to the server 104.

When a child apparatus 300 is powered on, the child apparatus 300 broadcasts, over a network to which the child apparatus 300 belongs, a search signal for searching for a parent apparatus (the head parent apparatus 200 in this case). The search signal includes attributes of the child apparatus 300, such as an apparatus type, a manufacturer's name (maker's name), a model number, a version and a serial number.

A search signal transmitted by a child apparatus 300 is received by the communication processing unit 202 and then input to the control unit 204. Based on the attributes of the child apparatus 300 included in the input search signal, the control unit 204 determines whether the child apparatus 300 is controllable by its own apparatus 200. For example, the control unit 204 determines that it is controllable if, among the attributes of the child apparatus 300, the apparatus type is the same as that of the head parent apparatus 200, and determines that it is uncontrollable if the apparatus type of the child apparatus 300 is different from that of the head parent apparatus 200. In addition, depending on the manufacturer's name, the control unit 204 may determine that it is uncontrollable even if the apparatus type is the same. Also, depending on the model number, the control unit 204 may determine that it is uncontrollable even if the apparatus type is the same.

In the case of determining that the head parent apparatus 200 can control the child apparatus 300, the control unit 204 instructs the search-signal response signal generating unit 208 to generate a search-signal response signal in response to the search signal, and transmits the search-signal response signal generated by the search-signal response signal generating unit 208 to the child apparatus 300 via the communication processing unit 202. The search-signal response signal includes an IP address of the head parent apparatus 200. Herewith, the child apparatus 300 is able to find a parent apparatus (the head parent apparatus 200 in this case) over the network and learn the presence of the parent apparatus.

The child apparatus 300 after receiving the search-signal response signal transmits a connection request signal to the head parent apparatus 200 which transmitted the search-signal response signal. The connection request signal transmitted by the child apparatus 300 is received by the communication processing unit 202 and then input to the control unit 204. The control unit 204 registers the IP address of the child apparatus 300 included in the input connection request signal. Subsequently, the control unit 204 reports information of the registered child apparatus 300 to the server 104. In this way, the head parent apparatus 200 is able to obtain a control command directed to the registered child apparatus 300 from the server 104, thereby enabling a multipoint connection to the child apparatus 300.

The control unit 204 instructs the connection-request response signal generating unit 210 to generate a response signal to the connection request signal, and transmits the connection-request response signal generated by the connection-request response signal generating unit 210 to the child apparatus 300 via the communication processing unit 202.

A control command transmitted by the server 104 is received by the communication processing unit 202, and then input to the control unit 204. The control unit 204 stores, in the storing unit 210, control information included in the input control command.

A child apparatus 300 periodically transmits a control information request signal in order to obtain control information directed to itself. The control information request signal is received by the communication processing unit 202, and then input to the control unit 204. Based on the input control information request signal, the control unit 204 instructs the control command generating unit 206 to generate a control command including control information included in the control information 2122 of the storing unit 212 and directed to the child apparatus 300 that transmitted the control information request signal, and then transmits the control command generated by the control command generating unit 206 to the child apparatus 300 via the communication processing unit 202. In this way, the head parent apparatus 200 is able to issue a control command to the child apparatus 300 via a multipoint connection to give an instruction.

Figure 4:
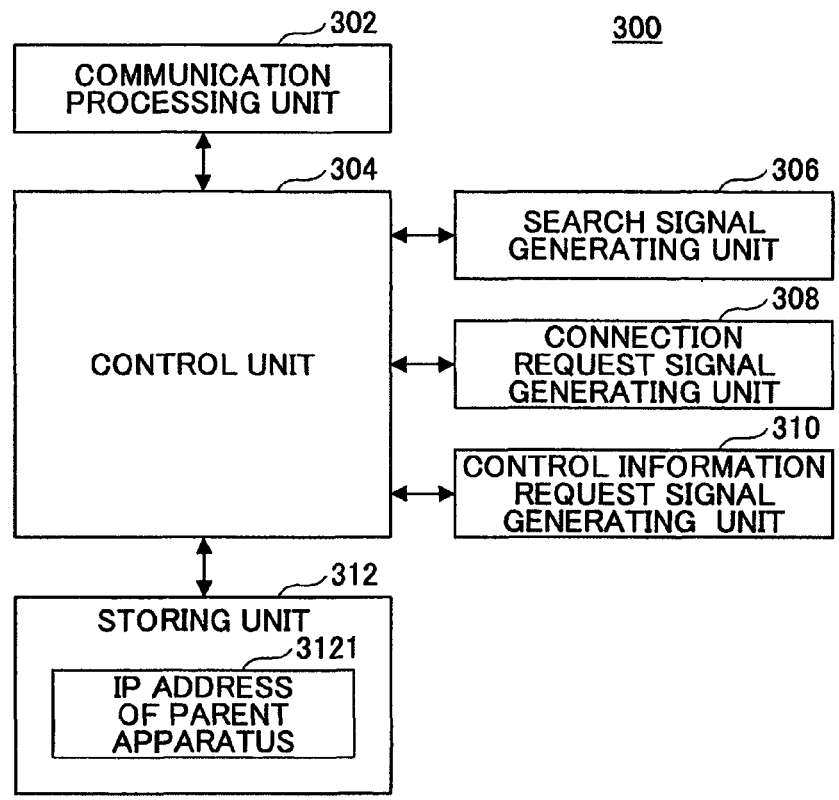
FIG. 4 is a block diagram showing a communication apparatus installed in an information home appliance according to one embodiment of the present disclosure.

The child apparatus 300 is explained next with reference to FIG. 4.

The child apparatus 300 includes a communication processing unit 302, a control unit 304, a search signal generating unit 306, a connection request signal generating unit 308, a control information request signal generating unit 310 and a storing unit 312.

In the case where, for example, the child apparatus 300 is powered on, the control unit 304 instructs the search signal generating unit 306 to generate a search signal for searching for the parent apparatus 200. The control unit 304 then broadcasts, over the network to which the child apparatus 300 belongs, the search signal generated by the search signal generating unit 306 via the communication processing unit 302. The search signal generating unit 306 generates a search signal including attributes of the child apparatus 300, such as an apparatus type, a manufacturer's name (maker's name), a model number, a version and a serial number.

In the case where the head parent apparatus 200 determines that it can control the child apparatus 300, the head parent apparatus 200 transmits a search-signal response signal including the IP address of the head parent apparatus 200 to the child apparatus 300 as a response signal of the search signal. The search-signal response signal transmitted by the head parent apparatus 200 is received by the communication processing unit 302 of the child apparatus 300 and then input to the control unit 304. The control unit 304 registers, in the storing unit 312, the IP address of the head parent apparatus 200 included in the input search-signal response signal. Then, the control unit 304 instructs the connection request signal generating unit 308 to generate a connection request signal used for requesting a connection to the head parent apparatus 200, and transmits the connection request signal generated by the connection request signal generating unit 308 to the head parent apparatus 200 via the communication processing unit 302.

Based on the connection request signal transmitted by the child apparatus 300, the head parent apparatus 200 registers the IP address of the child apparatus 300 included in the connection request signal, reports information of the registered child apparatus 300 to the server 104, and then transmits to the child apparatus 300 a connection-request response signal in response to the connection request signal. The connection-request response signal transmitted by the head parent apparatus 200 is received by the communication processing unit 302 of the child apparatus 300 and then input to the control unit 304. The control unit 304 completes the connection process based on the input connection request response signal.

The control unit 304 instructs the control information request signal generating unit 310 to generate a control information request signal in order to query the head parent apparatus 200, at a predetermined frequency, for control information directed to the child apparatus 300. The control unit 304 transmits the control information request signal generated by the control information request signal generating unit 310 via the communication processing unit 302.

Based on the control information request signal, the head parent apparatus 200 generates a control command including control information included in the control information 2122 stored in the storing unit 212 and directed to the child apparatus 300 that transmitted the control information request signal, and transmits the control command to the child apparatus 300. The control unit 304 of the child apparatus 300 performs control over its own apparatus 300 according to the control command transmitted by the parent apparatus 200.

Figure 5:
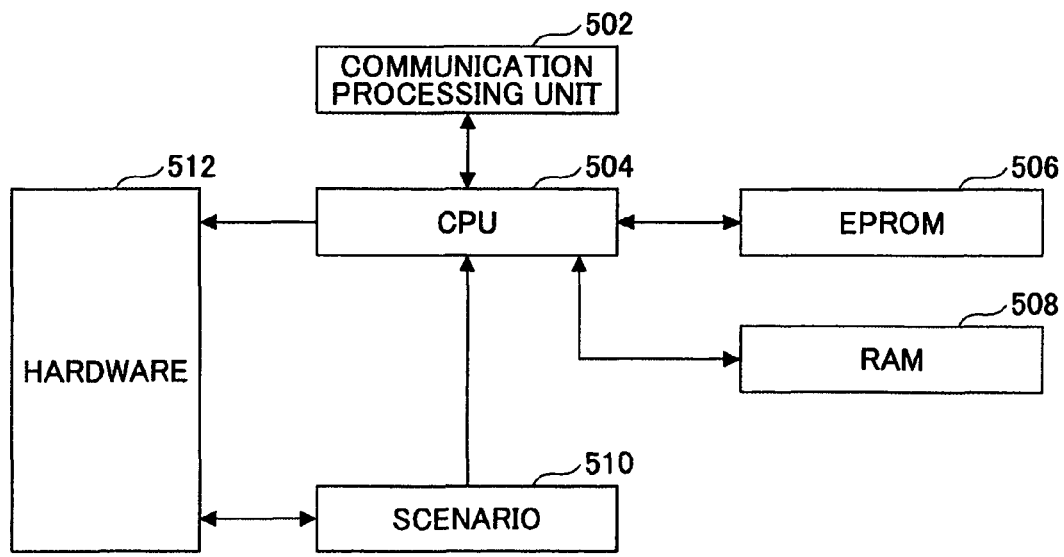
FIG. 5 is a block diagram showing a hardware configuration of a communication apparatus installed in an information home appliance according to one embodiment of the present disclosure.

The above-described head parent apparatus 200 and child apparatus 300 are achieved using a communication processing unit 502, a CPU 504, an EPROM 506, a RAM 508, a scenario 510 and hardware 512, as illustrated in FIG. 5. The CPU 504 executes functions of the control unit 204 of the head parent apparatus 200 and functions of the control unit 304 of the child apparatus 300. The EPROM 506 stores programs used to implement the control command generating unit 206, the search-signal response signal generating unit 208 and the connection-request response signal generating unit 210 of the head parent apparatus 200 and programs used to implement the search signal generating unit 306, the connection request signal generating unit 308 and the control information request signal generating unit 310 of the child apparatus 300. The RAM 508 stores the IP addresses 2121 and the control information 2122 of the child apparatuses 300 used in the head parent apparatus 200 and an IP address 3121 of the parent apparatus 200 used in the child apparatuses 300. A scenario 510 records information indicating control procedures for the control information 2122. The hardware 512 is a collection of physical components.

Figure 6:
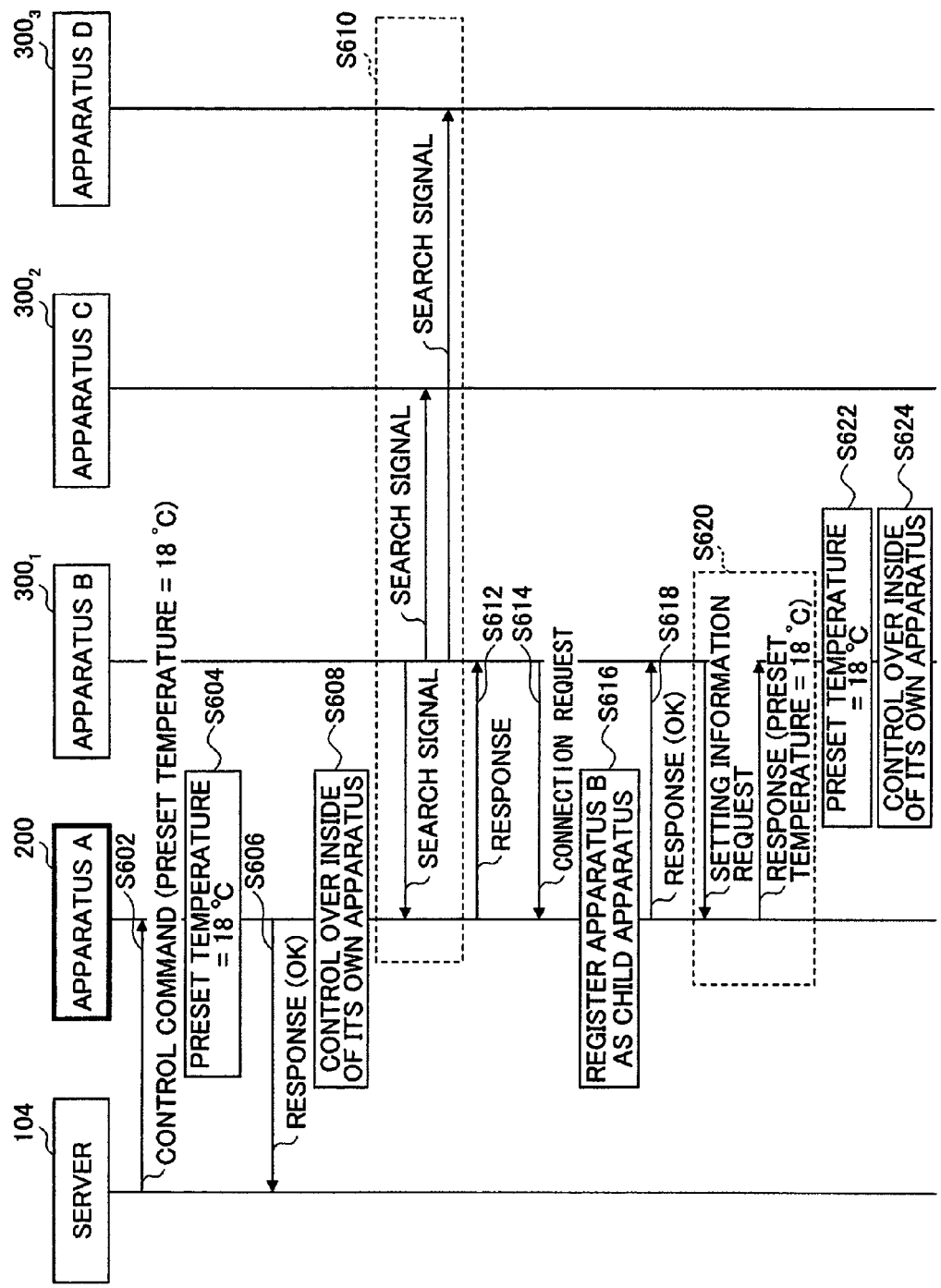
FIG. 6 is a flowchart showing operations of an operation system that controls information home appliances connected to an IP network according to one embodiment of the present disclosure.

Next are described operations of the information home appliance control system according to the present embodiment with reference to FIG. 6. The present embodiment describes the case where the server 104 transmits a control command having a preset temperature as control information. Note that the connection process between the head parent apparatus 200 and the server 104 has been completed.

The following shows a sequence in which the head parent apparatus 200 performs internal control according to a control command received from the server 104. The following also shows a sequence in which a child apparatus 300 searches for a parent apparatus (the head parent apparatus 200 in this case) over a network to which the child apparatus 300 belongs, connects to the head parent apparatus 200, obtains control information held by the head parent apparatus 200, and then performs internal control according to the control information.

The user (operator) operates the client PC 102 to input a preset temperature, which is then input to the server 104. The server 104 generates a control command including the input preset temperature and transmits the control command to the head parent apparatus (apparatus A) 200 (Step S602). For example, a control command including control information indicating a preset temperature of 18° C. is transmitted. In this way, the server 104 issues a control command to the managing head parent apparatus 200 in order to deliver the setting information.

The control command transmitted by the server 104 is received by the communication processing unit 202 of the head parent apparatus 200 and then input to the control unit 204. Based on control information included in the input control command, the control unit 204 sets the preset temperature (Step S604). The control unit 204 transmits a signal to the server 104 in response to the control command (Step S606). The control unit 204 continues to perform control within itself 200 (Step S608).

At this point, the child apparatus (apparatus B) $300_1$ is powered on, and the control unit 304 of the child apparatus 300, instructs the search signal generating unit 306 to generate a search signal. The control unit 304 inputs to the communication processing unit 302 the search signal generated by the search signal generating unit 306. The communication processing unit 302 broadcasts the input search signal over the network to which its own apparatus 300, belongs (Step S610).

The search signal broadcast by the child apparatus $300_1$ is received by the communication processing unit 202 of the head parent apparatus 200 and then input to the control unit 204. Based on the attributes included in the search signal, the control unit 204 determines whether its own apparatus 200 is operable as a parent apparatus of the child apparatus $300_1$. In the case of determining that the head parent apparatus 200 is operable as a parent apparatus of the child apparatus $300_1$, the control unit 204 instructs the search-signal response signal generating unit 208 to generate a search-signal response signal in response to the search signal, and transmits the search-signal response signal generated by the search-signal response signal generating unit 208 to the child apparatus 300, via the communication processing unit 202 (Step S612). The search-signal response signal includes the IP address of the head parent apparatus 200.

The search-signal response signal transmitted by the head parent apparatus 200 is received by the communication processing unit 302 of the child apparatus $300_1$, and then input to the control unit 304. Based on the IP address included in the search-signal response signal, the control unit 304 instructs the connection request signal generating unit 306 to generate a connection request signal including the IP address of the child apparatus $300_1$. The control unit 304 inputs to the communication processing unit 302 the connection request signal generated by the connection request signal generating unit 306. The communication processing unit 302 transmits the input connection request signal to the head parent apparatus 200 (Step S614).

The connection request signal transmitted by the child apparatus 300, is received by the communication processing unit 202 of the head parent apparatus 200 and then input to the control unit 204. The control unit 204 stores in the storing unit 210 the IP address of the child apparatus 300, included in the input connection request signal, thereby registering the child apparatus 300, as a child apparatus of the head parent apparatus 200 (Step S616). Also, the control unit 204 instructs the connection-request response signal generating unit 208 to generate a signal in response to the connection request signal, and transmits the connection-request response signal generated by the connection-request response signal generating unit 208 to the child apparatus 300, via the communication processing unit 202 (Step S618).

The control unit 304 of the child apparatus $300_1$ instructs the control information request signal generating unit 308 to generate a control information request signal in order to query the head parent apparatus 200 for control information at a predetermined frequency. The control unit 304 transmits, via the communication processing unit 302, the control information request signal generated by the control information request signal generating unit 308.

The control information request signal transmitted by the child apparatus 300, is received by the communication processing unit 202 of the head parent apparatus 200 and then input to the control unit 204. Based on the input control information request signal, the control unit 204 instructs the control command generating unit 206 to generate a control command including control information included in the control information 2122 of the storing unit 212 and directed to a child apparatus 300 that transmitted the control information request signal, and then transmits the control command generated by the control command generating unit 206 to the child apparatus 300 via the communication processing unit 202 (Step S620).

The control command transmitted by the head parent apparatus 200 is received by the communication processing unit 302 of the child apparatus 300, and then input to the control unit 304. The control unit 304 performs control over its own apparatus $300_1$ according to the control information included in the input control command (Step S622). The control unit 304 continues to perform control within itself $300_1$ (Step S624).

Figure 7:
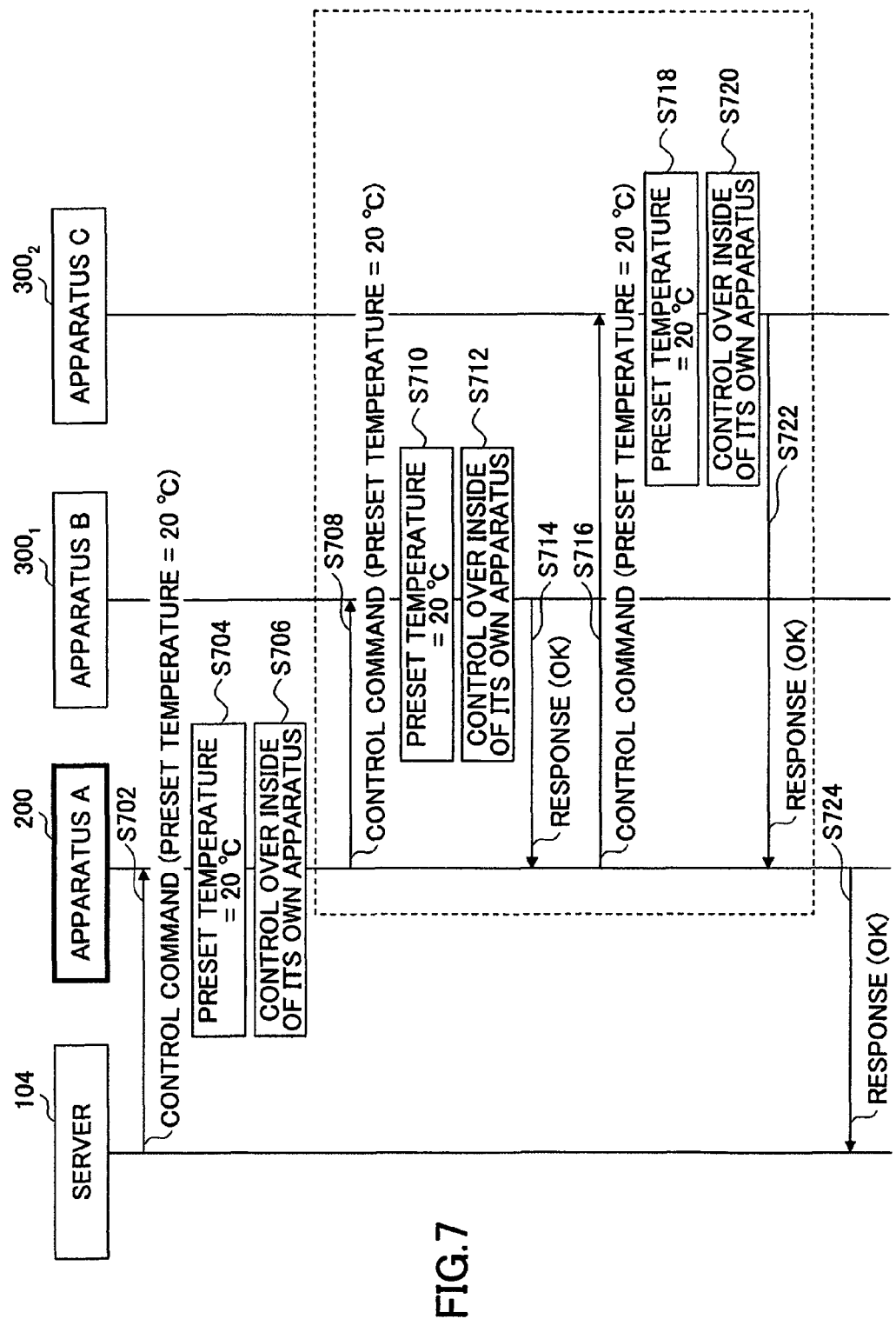
FIG. 7 is a flowchart showing operations of an operation system which controls information home appliances connected to an IP network according to one embodiment of the present disclosure.

Next are described other operations of the information home appliance control system according to the present embodiment with reference to FIG. 7. Note that, in the present embodiment, the connection process between the head parent apparatus 200 and the server 104 has been completed and the child apparatus (apparatus B) $300_1$ and the child apparatus (apparatus C) $300_2$ are registered as child apparatuses of the head parent apparatus 200. Here is described a sequence in which, by an instruction from the server 104, control is performed on the head parent apparatus 200 as well as all the child apparatuses 300 ($300_1$ and $300_2$) under the head parent apparatus 200.

The user (operator) operates the client PC 102 to input a preset temperature, which is then input to the server 104. The server 104 generates a control command including the input preset temperature, and transmits the control command to the head parent apparatus (apparatus A) 200 (Step S702). For example, a control command including control information indicating a preset temperature of 20° C. is transmitted.

The control command transmitted by the server 104 is received by the communication processing unit 202 of the head parent apparatus 200 and then input to the control unit 204. Based on the control information included in the input control command, the control unit 204 sets the preset temperature (Step S704). The control unit 204 continues to perform control within itself 200 (Step S706).

The control unit 304 of the child apparatus $300_1$ generates a control information request signal at a predetermined frequency according to a procedure similar to the above-described procedure, and transmits the control information request signal via the communication processing unit 302.

The control information request signal transmitted by the child apparatus $300_1$ is received by the communication processing unit 202 of the head parent apparatus 200 and then input to the control unit 204. Based on the input control information request signal, the control unit 204 instructs the control command generating unit 206 to generate a control command including control information included in the control information 2122 of the storing unit 212 and directed to the child apparatus $300_1$ that transmitted the control-information request signal, and then transmits the control command generated by the control command generating unit 206 to the child apparatus $300_1$ via the communication processing unit 202 (Step S708). Based on the control information included in the input control command, the control unit 304 sets the preset temperature (Step S710). The control unit 304 continues to perform control within itself 300, (Step S712). The control unit 304 of the child apparatus $300_1$ generates a response signal for reporting that the setting of the preset temperature is finished and transmits it to the head parent apparatus 200 (Step S714).

In the same manner, the control unit 304 of the child apparatus $300_2$ (apparatus C) generates a control information request signal at a predetermined frequency according to a procedure similar to the above-described procedure, and transmits the control information request signal via the communication processing unit 302.

The control information request signal transmitted by the child apparatus $300_2$ is received by the communication processing unit 202 of the head parent apparatus 200 and then input to the control unit 204. Based on the input control information request signal, the control unit 204 instructs the control command generating unit 206 to generate a control command including control information included in the control information 2122 of the storing unit 212 and directed to the child apparatus $300_2$ that transmitted the control-information request signal, and then transmits the control command generated by the control command generating unit 206 to the child apparatus $300_2$ via the communication processing unit 202 (Step S716). Based on the control information included in the input control command, the control unit 304 of the child apparatus $300_2$ sets the preset temperature (Step S718). The control unit 304 continues to perform control within itself $300_2$ (Step S720). The control unit 304 generates a response signal for reporting that the setting of the preset temperature is finished and transmits it to the head parent apparatus 200 (Step S722).

After the preset temperature is set for all the child apparatuses belonging to the head parent apparatus 200, the control unit 204 of the head parent apparatus 200 generates a response signal for reporting that the setting of the preset temperature in the child apparatuses 300 has been completed, and transmits the response signal to the server 104 (Step S724).

Figure 8:
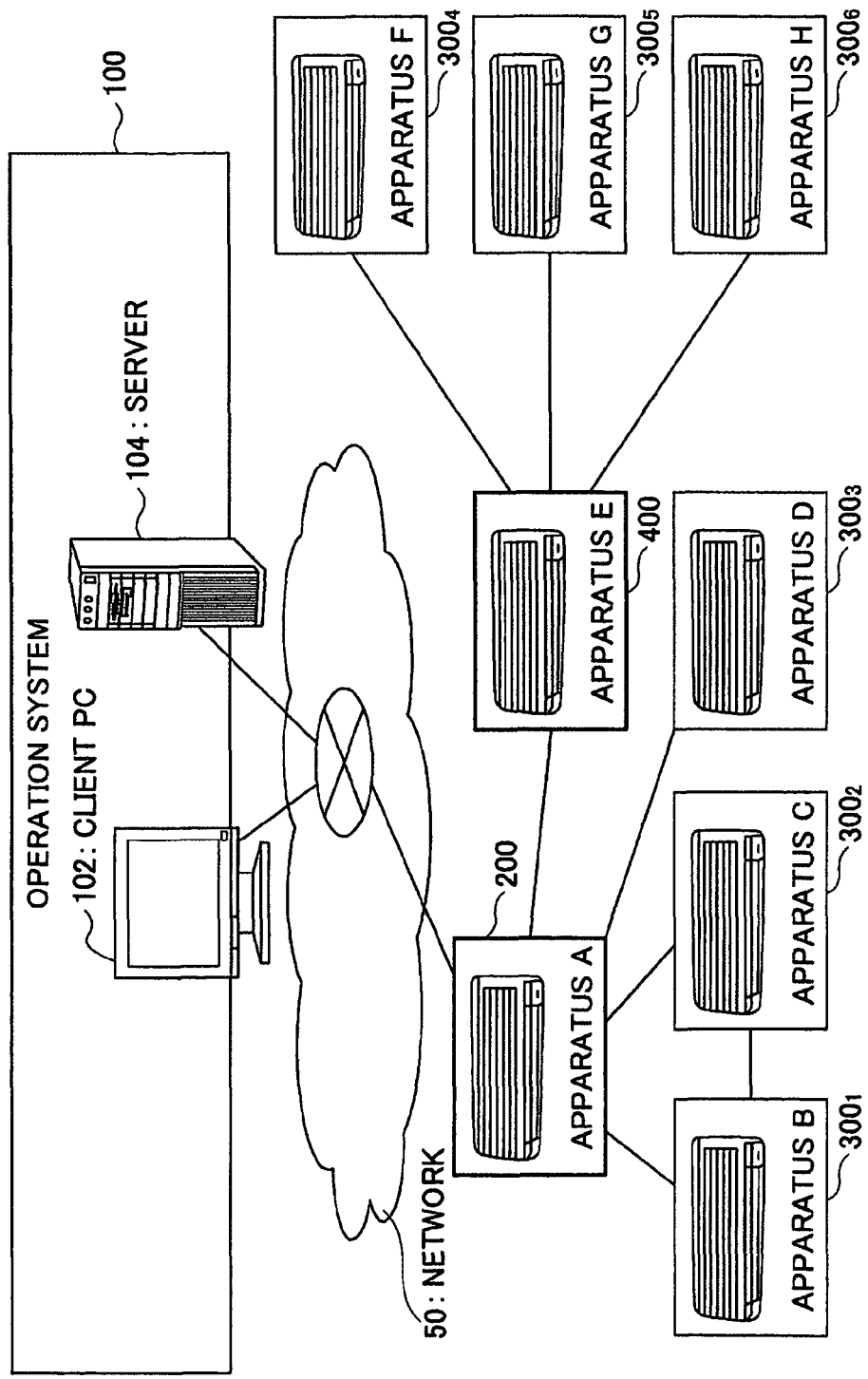
FIG. 8 illustrates an operation system for controlling information home appliances connected to an IP network according to one embodiment of the present disclosure.

Next is described an information home appliance control system according to another embodiment of the present disclosure with reference to FIG. 8.

The information home appliance control system of the present embodiment includes the operation system 100; the communication apparatus 200 (hereinafter, referred to as "head parent apparatus") connected to the operation system 100 via the network 50; the communication apparatuses 300 ($300_1$, $300_2$, $300_3$ and $300_4$) ("child apparatuses") connected to the parent apparatus 200; a communication apparatus 400 ("parent apparatus"); and communication apparatuses 300 ($300_4$, $300_5$ and $300_6$) ("child apparatuses") connected to the parent apparatus 400. Although the present embodiment is described using a case in which communication apparatuses are installed in air conditioners, which are examples of information home appliances, the communication apparatuses may be installed in appliances other than air conditioners.

Figure 9:
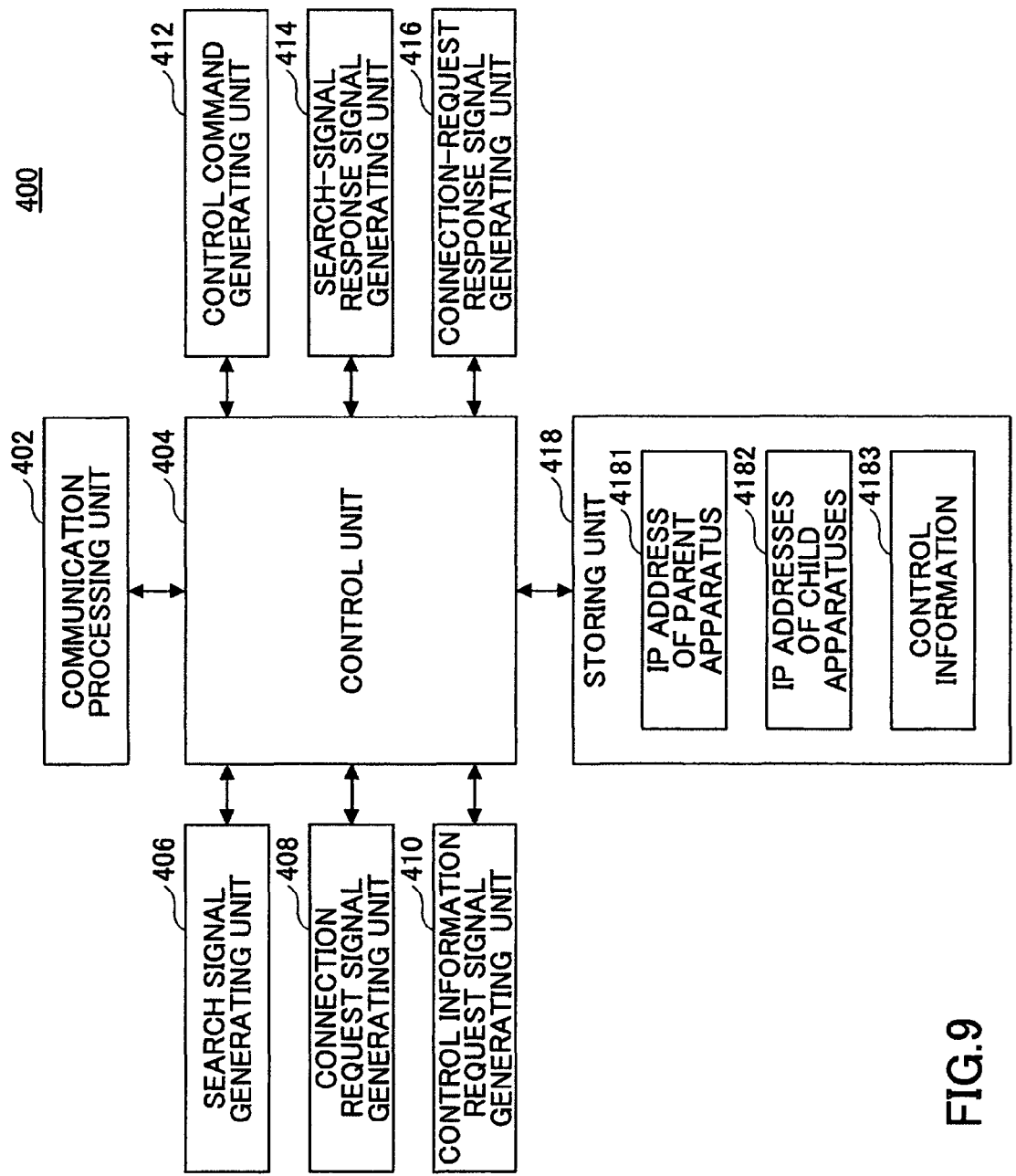
FIG. 9 is a block diagram showing a communication apparatus to be installed in an information home appliance according to one embodiment of the present disclosure.

The operation system 100, the head parent apparatus 200 and the child apparatuses 300 are the same as those described in the previous embodiment. The head parent apparatus 200 and the server 104 are connected via a router. The head parent apparatus 200, the parent apparatus 400 and the child apparatuses 300 form, for example, a mesh network. The parent apparatus 400 is described next with reference to FIG. 9. The parent apparatus 400 is cascade-connected as a child apparatus of the head parent apparatus 200. The parent apparatus 400 includes a communication processing unit 402, a control unit 404, a search signal generating unit 406, a connection request signal generating unit 408, a control information request signal generating unit 410, a control command generating unit 412, a search-signal response signal generating unit 414, a connection-request response signal generating unit 416 and a storing unit 418. The storing unit 418 stores an IP address 4181 of a parent apparatus, IP addresses 4182 of child apparatuses, and control information 4183.

The parent apparatus 400 has functions of the above-described head parent apparatus 200 and the child apparatus 300. The parent apparatus 400 has a function of managing multipoint connections. The multipoint connection managing function achieves registering IP addresses of the child apparatuses 300 based on connection requests transmitted from the individual child apparatuses 300 and transmitting, to a corresponding child apparatus among the registered child apparatuses, a control command transmitted from the head parent apparatus 200.

For example, when the parent apparatus 400 is powered on, the control unit 404 instructs the search signal generating unit 406 to generate a search signal for searching for the head parent apparatus 200, and broadcasts, via the communication processing unit 402, the search signal generated by the search signal generating unit 406 over the network to which the parent apparatus 400 belongs. The search signal generating unit 406 generates a search signal including attributes of the parent apparatus 400, such as an apparatus type, a manufacturer's name (maker's name), a model number, a version and a serial number.

In the case of determining that the head parent apparatus 200 can control the parent apparatus 400, the head parent apparatus 200 transmits a search-signal response signal including the IP address of the head parent apparatus 200 to the parent apparatus 400 as a response signal of the search signal. The search-signal response signal transmitted by the head parent apparatus 200 is received by the communication processing unit 402 of the parent apparatus 400 and then input to the control unit 404. The control unit 404 registers, in the storing unit 418, the IP address of the head parent apparatus 200 included in the input search-signal response signal. Then, the control unit 404 instructs the connection request signal generating unit 408 to generate a connection request signal used for requesting a connection to the head parent apparatus 200, and transmits the connection request signal generated by the connection request signal generating unit 408 to the head parent apparatus 200 via the communication processing unit 402.

Based on the connection request signal, the head parent apparatus 200 registers the parent apparatus 400, and transmits a connection-request response signal in response to the connection request signal. The connection-request response signal transmitted by the head parent apparatus 200 is received by the communication processing unit 402 of the parent apparatus 400 and then input to the control unit 404. The control unit 404 completes the connection process based on the input connection-request response signal. The control unit 404 instructs the control information request signal generating unit 408 to generate a control information request signal in order to query the head parent apparatus 200, at a predetermined frequency, for control information directed to the parent apparatus 400 and the child apparatuses 300 belonging to the parent apparatus 400. The control unit 404 transmits, via the communication processing unit 402, the control information request signal generated by the control information request signal generating unit 408.

Based on the control information request signal, the head parent apparatus 200 generates a control command including control information included in the control information 2122 of the storing unit 212 and directed to the parent apparatus 400 that transmitted the control information request signal and the child apparatuses 300 under the parent apparatus 400, and transmits the control command to the parent apparatus 400. The control unit 404 performs control over its own apparatus 400 and the child apparatuses 300 under the parent apparatus 400 according to the control command transmitted by the parent apparatus 200.

In the case where, for example, a child apparatus 300 is powered on, the child apparatus 300 transmits a search signal in order to search for a parent apparatus. The term "parent apparatus" here includes the head parent apparatus 200 and the parent apparatus 400. The search signal includes attributes of the child apparatus 300, such as an apparatus type, a manufacturer's name (maker's name), a model number, a version and a serial number.

The search signal transmitted by the child apparatus 300 is received by the communication processing unit 402 of the parent apparatus 400 and then input to the control unit 404. Based on the attributes of the child apparatus 300 included in the input search signal, the control unit 404 determines whether the child apparatus 300 is controllable by the parent apparatus 400. For example, the control unit 404 determines that it is controllable if, among the attributes of the child apparatus 300, the apparatus type is the same as that of the parent apparatus 400, and determines that it is uncontrollable if the apparatus type of the child apparatus 300 is different from that of the parent apparatus 400. In addition, depending on the manufacturer's name, the control unit 404 may determine that it is uncontrollable even if the apparatus type is the same. Also, depending on the model number, the control unit 404 may determine that it is uncontrollable even if the apparatus type is the same. In the case of determining that the parent apparatus 400 can control the child apparatus 300, the control unit 404 instructs the search-signal response signal generating unit 414 to generate a search-signal response signal in response to the search signal, and transmits the search-signal response signal generated by the search-signal response signal generating unit 414 to the child apparatus 300 via the communication processing unit 402. The search-signal response signal includes the IP address of the parent apparatus 400.

The child apparatus 300 after receiving the search-signal response signal transmits a connection request signal to the parent apparatus 400 which transmitted the search-signal response signal. The connection request signal transmitted by the child apparatus 300 is received by the communication processing unit 402 of the parent apparatus 400 and then input to the control unit 404. The control unit 404 registers, in the storing unit 418, the IP address of the child apparatus 300 included in the input connection request signal. Subsequently, the control unit 404 reports information of the registered child apparatus 300 to the head parent apparatus 200. In this way, the parent apparatus 400 is able to obtain a control command directed to the registered child apparatus 300 from the head parent apparatus 200, thereby enabling a multipoint connection to the child apparatus 300. The control unit 404 instructs the connection-request response signal generating unit 416 to generate a signal to the connection request signal, and transmits the connection-request response signal generated by the connection-request response signal generating unit 416 to the child apparatus 300 via the communication processing unit 402.

The control command transmitted by the head parent apparatus 200 is received by the communication processing unit 402 of the parent apparatus 400 and then input to the control unit 404. The control unit 404 performs control over its own apparatus 400 based on control information included in the input control command, and also stores the control information in the storing unit 418.

The child apparatus 300 periodically transmits a control information request signal in order to obtain control information directed to itself. The control information request signal is received by the communication processing unit 402 of the parent apparatus 400 and then input to the control unit 404. Based on the input control information request signal, the control unit 404 instructs the control command generating unit 412 to generate a control command including control information included in control information 4183 of the storing unit 418 and directed to the child apparatus 300 that transmitted the control information request signal, and then transmits the control command generated by the control command generating unit 412 to the child apparatus 300 via the communication processing unit 402. In this way, the head parent apparatus 200 is able to issue a control command to the child apparatus 300 via a multipoint connection to give an instruction.

The above-described parent apparatus 200 is achieved by the hardware configuration described with reference to FIG. 5. The CPU 504 executes functions of the control unit 404 described above. The EPROM 506 stores programs used to implement the search signal generating unit 406, the connection request signal generating unit 408, the control information request signal generating unit 410, the control command generating unit 412, the search-signal response signal generating unit 414 and the connection request response signal generating unit 416. The RAM 508 stores the IP address 4181 of the parent apparatus, the IP addresses 4182 and the control information 4183 of the child apparatuses.

Figure 10:
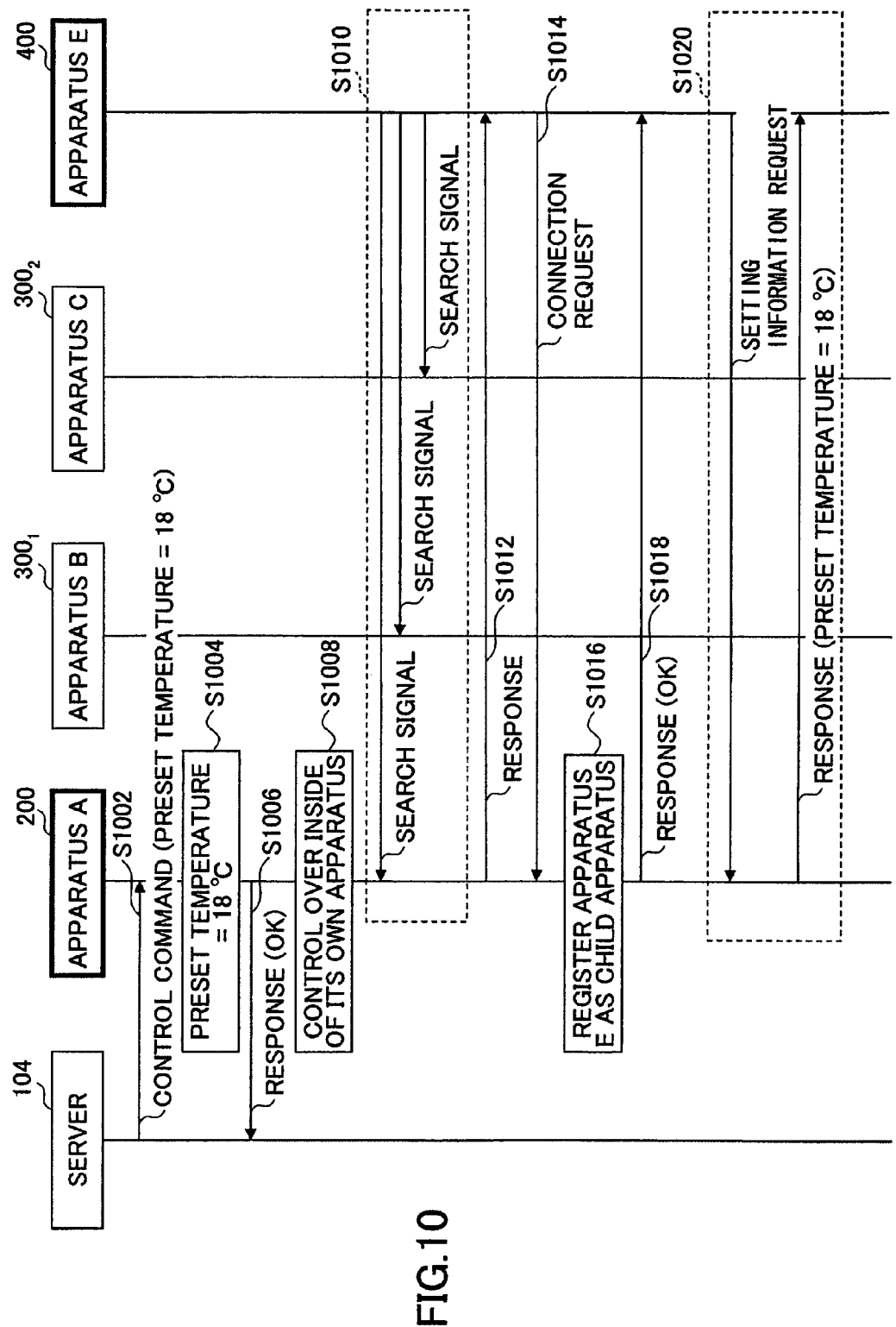
FIG. 10 is a flowchart showing operations of an operation system that controls information home appliances connected to an IP network according to one embodiment of the present disclosure.

Next are described operations of the information home appliance control system according to the present embodiment with reference to FIG. 10. The following shows a sequence in which parent apparatuses have a multistage configuration by a cascade connection. Specifically, the multistage configuration is achieved by connecting, as a parent of the parent apparatus 400, the head parent apparatus 200 to the parent apparatus 400. According to the configuration, the server 104 is able to control an infinite number of apparatuses.

The user (operator) operates the client PC 102 to input a preset temperature, which is then input to the server 104. The server 104 generates a control command including the input preset temperature and transmits the control command to the head parent apparatus (apparatus A) 200 (Step S1002) For example, a control command including control information indicating a preset temperature of 18° C. is transmitted.

The control command transmitted by the server 104 is received by the communication processing unit 202 of the head parent apparatus 200 and then input to the control unit 204. Based on the control information included in the input control command, the control unit 204 sets the preset temperature (Step S1004). The control unit 204 transmits a signal to the server 104 in response to the control command (Step S1006). The control unit 204 continues to perform control within itself 200 (Step S1008).

At this point, the parent apparatus (apparatus E) 400 is powered on, and the control unit 404 of the parent apparatus 400 instructs the search signal generating unit 406 to generate a search signal. The control unit 404 inputs to the communication processing unit 402 the search signal generated by the search signal generating unit 406. The communication processing unit 402 broadcasts the input search signal over the network in which its own parent apparatus 400 is present (Step S1010).

The search signal broadcast by the parent apparatus 400 is received by the communication processing unit 202 of the head parent apparatus 200 and then input to the control unit 204. Based on the attributes included in the search signal, the control unit 204 determines whether its own apparatus 200 is operable as a parent apparatus. In the case of determining that it is operable as a parent apparatus, the control unit 204 instructs the search-signal response signal generating unit 208 to generate a search-signal response signal in response to the search signal, and transmits the search-signal response signal generated by the search-signal response signal generating unit 208 to the parent apparatus 400 via the communication processing unit 202 (Step S1012). The search-signal response signal includes the IP address of the head parent apparatus 200.

The search-signal response signal transmitted by the head parent apparatus 200 is received by the communication processing unit 402 of the parent apparatus 400. The control unit 404 instructs the connection request signal generating unit 408 to generate a connection request signal. The control unit 404 inputs to the communication processing unit 402 the connection request signal generated by the connection request signal generating unit 408. The communication processing unit 402 transmits the input connection request signal to the head parent apparatus (Step S1014).

The connection request signal transmitted by the parent apparatus 400 is received by the communication processing unit 202 of the head parent apparatus 200 and then input to the control unit 204. The control unit 204 stores in the storing unit 210 the IP address of the parent apparatus 400 included in the input connection request signal, thereby registering the parent apparatus 400 as a child apparatus of the head parent apparatus 200 (Step S1016). Also, the control unit 204 instructs the connection request response signal generating unit 208 to generate a signal in response to the connection request signal, and transmits the connection request response signal generated by the connection request response signal generating unit 208 to the parent apparatus 400 via the communication processing unit 202 (Step S1018).

The control unit 404 of the parent apparatus 400 instructs the control information request signal generating unit 410 to generate a control information request signal in order to query the head parent apparatus 200, at a predetermined frequency, for control information directed to its own apparatus 400 and the child apparatuses 300 under the parent apparatus 400. The control unit 404 transmits, via the communication processing unit 402, the control information request signal generated by the control information request signal generating unit 410.

The control information request signal transmitted by the parent apparatus 400 is received by the communication processing unit 202 of the head parent apparatus 200 and then input to the control unit 204. Based on the input control information request signal, the control unit 204 instructs the control command generating unit 206 to generate a control command including control information included in the control information 2122 of the storing unit 210 and directed to the parent apparatus 400 that transmitted the control information request signal and the child apparatuses under the parent apparatus 400. The control unit 204 then transmits the control command generated by the control command generating unit 206 to the parent apparatus 400 via the communication processing unit 202 (Step S1020).

The control unit 404 performs control over its own apparatus 400 according to the control information included in the control command transmitted by the head parent apparatus 200. The control unit 404 continues to perform control within itself 400. The parent apparatus 400 stores the control information in the storing unit 418.

The parent apparatus 400 periodically requests the head parent apparatus 200 for control information, and performs control within itself 400 according to the control information included in a control command and operates the child apparatuses 300 under the parent apparatus 400 as a parent apparatus.

Figure 11:
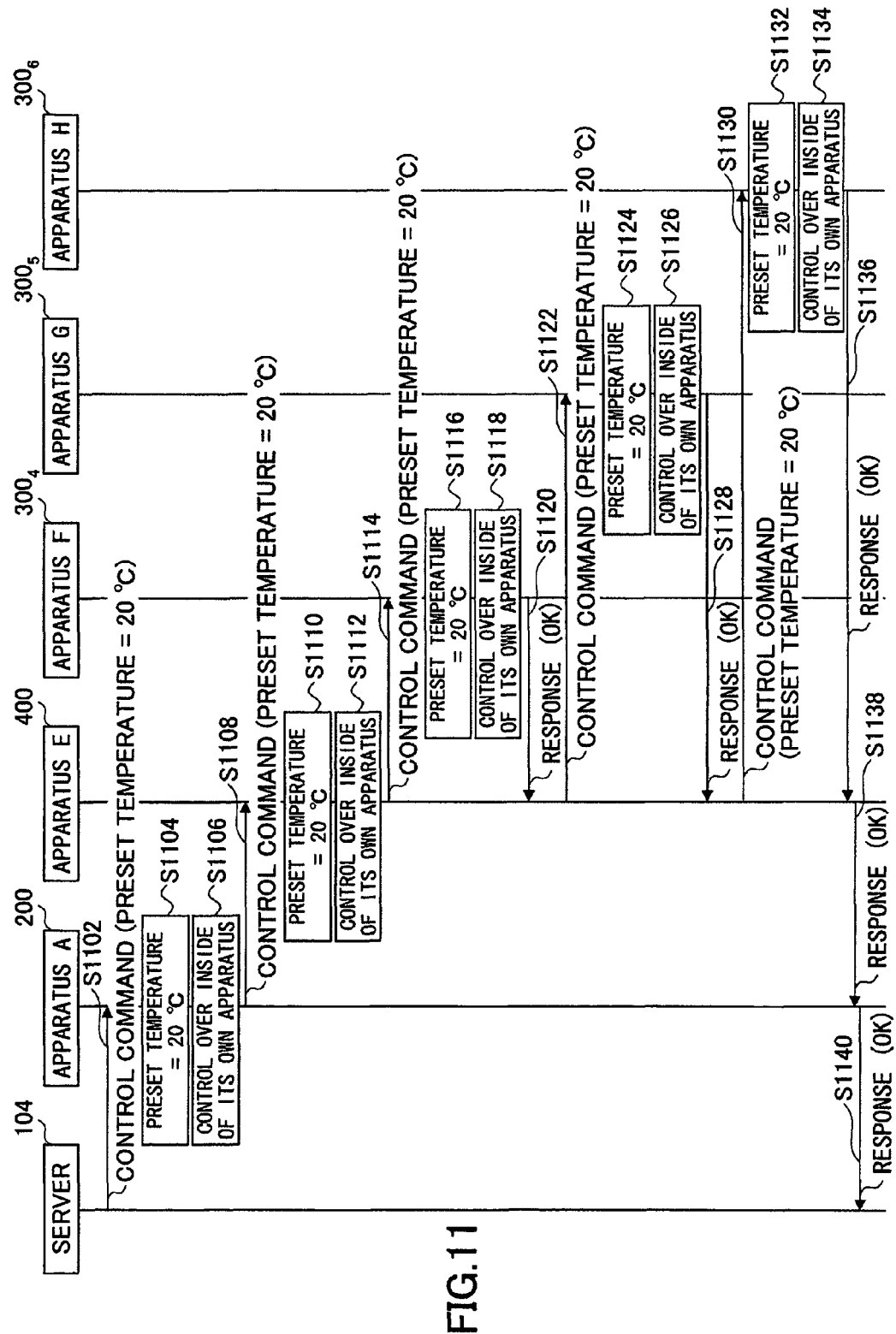
FIG. 11 is a flowchart showing operations of an operation system that controls information home appliances connected to an IP network according to one embodiment of the present disclosure.

Next are described other operations of the information home appliance control system according to the present embodiment with reference to FIG. 11. Note that, in the present embodiment, the connection process between the head parent apparatus 200 and the server 104 has been completed, the parent apparatus (apparatus E) 400 is registered as a child apparatus of the head parent apparatus 200, and the child apparatuses 300₄, 300₅ and 300₆ (apparatuses F, G and H) are registered as child apparatuses of the parent apparatus 400.

The user operates the client PC 102 to input a preset temperature, which is input to the server 104. The server 104 generates a control command including the input preset temperature and transmits the control command to the head parent apparatus (apparatus A) 200 (Step S1102). For example, a control command including control information indicating a preset temperature of 20° C. is transmitted.

The control command transmitted by the server 104 is received by the communication processing unit 202 of the head parent apparatus 200 and then input to the control unit 204. Based on the control information included in the input control command, the control unit 204 sets the preset temperature (Step S1104). The control unit 204 continues to perform control within itself (Step S1106).

The control unit 404 of the parent apparatus 400 generates a control information request signal and transmits it via the communication processing unit 402 at a predetermined frequency according to the same procedures as described above. The control information request signal transmitted by the parent apparatus 400 is received by the communication processing unit 202 of the head parent apparatus 200 and then input to the control unit 204. Based on the input control information request signal, the control unit 204 instructs the control command generating unit 206 to generate a control command including control information included in the control information 2122 of the storing unit 210 and directed to the parent apparatus 400 that transmitted the control information request signal and the child apparatuses 300 under the parent apparatus 400. The control unit 204 then transmits the control command generated by the control command generating unit 206 to the parent apparatus 400 via the communication processing unit 202 (Step S1108). Based on the control information included in the input control command, the control unit 404 of the parent apparatus 400 sets the preset temperature (Step S1110). The control unit 404 continues to perform control within itself 400 (Step S1112).

The control unit 304 of the child apparatus $300_4$ generates a control information request signal and transmits it via the communication processing unit 302 at a predetermined frequency according to the same procedures as described above. The control information request signal transmitted by the child apparatus $300_4$ is received by the communication processing unit 402 of the parent apparatus 400 and then input to the control unit 404. Based on the input control information request signal, the control unit 404 instructs the control command generating unit 412 to generate a control command including control information included in the control information 4183 of the storing unit 418 and directed to the child apparatus $300_4$ that transmitted the control information request signal. The control unit 404 then transmits the control command generated by the control command generating unit 412 to the child apparatus $300_4$ via the communication processing unit 402 (Step S1114). Based on the control information included in the input control command, the control unit 304 of the child apparatus $300_4$ sets the preset temperature (Step S1116). The control unit 304 continues to perform control within itself $300_4$ (Step S1118). The control unit 304 generates a response signal for reporting that the setting of the preset temperature is finished and transmits it to the parent apparatus 400 (Step S1120).

Similarly, the control unit 304 of the child apparatus $300_5$ generates a control information request signal and transmits it via the communication processing unit 302 at a predetermined frequency according to the same procedures as described above.

The control information request signal transmitted by the child apparatus $300_5$ is received by the communication processing unit 402 of the parent apparatus 400 and then input to the control unit 404. Based on the input control information request signal, the control unit 404 instructs the control command generating unit 412 to generate a control command including control information included in the control information 4183 of the storing unit 418 and directed to the child apparatus $300_5$ that transmitted the control information request signal. The control unit 404 then transmits the control command generated by the control command generating unit 412 to the child apparatus $300_5$ via the communication processing unit 402 (Step S1122). Based on the control information included in the input control command, the control unit 304 of the child apparatus $300_5$ sets the preset temperature (Step S1124). The control unit 304 continues to perform control within itself $300_5$ (Step S1126). The control unit 304 generates a response signal for reporting that the setting of the preset temperature is finished and transmits it to the parent apparatus 400 (Step S1128).

Similarly, the control unit 304 of the child apparatus $300_6$ generates a control information request signal and transmits it via the communication processing unit 302 at a predetermined frequency according to the same procedures as described above.

The control information request signal transmitted by the child apparatus $300_6$ is received by the communication processing unit 402 of the parent apparatus 400 and then input to the control unit 404. Based on the input control information request signal, the control unit 404 instructs the control command generating unit 412 to generate a control command including control information included in the control information 4183 of the storing unit 418 and directed to the child apparatus $300_6$ that transmitted the control information request signal. The control unit 404 then transmits the control command generated by the control command generating unit 412 to the child apparatus $300_6$ via the communication processing unit 402 (Step S1130). Based on the control information included in the input control command, the control unit 304 of the child apparatus $300_6$ sets the preset temperature (Step S1132). The control unit 304 continues to perform control within itself $300_6$ (Step S1134). The control unit 304 generates a response signal for reporting that the setting of the preset temperature is finished and transmits it to the parent apparatus 400 (Step S1136).

The control unit 404 of the parent apparatus 400 generates a response signal for reporting that the setting of the preset temperature in the child apparatuses 300 under its own apparatus 400 has been completed, and transmits the response signal to the head parent apparatus 200 (Step S1138).

The control unit 204 of the head parent apparatus 200 generates a response signal for reporting that the setting of the preset temperature for the parent apparatus 400 under its own apparatus 200 has been completed, and transmits the response signal to the server 104 (Step S1140).

The operation system for controlling apparatuses connected to an IP network according to one embodiment of the present disclosure enables control of a large number of apparatuses never before possible.

The server does not have to hold connection information of all apparatuses connected to the IP network, and is able to perform control over all apparatuses which request control.

A connection between the server and a communication apparatus is not necessarily essential, and therefore, communication network load between the server and the apparatus can be reduced.

A security policy, such as a firewall, is not necessary for a connection between the server and each communication apparatus.

In conclusion, one embodiment of the present disclosure achieves communication apparatuses that are installed in information home appliances connected to an IP network and are capable of reducing load to an operation system that controls the information home appliances. Also, another embodiment of the present disclosure achieves a communication apparatus control method capable of reducing load to an operation system which controls information home appliances connected to an IP network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:
1. A communication system comprising:
 a server that is connected to an IP network and generates a control command;
 a first communication apparatus that is installed in a first information home appliance and connected to the IP network as a head parent apparatus of a parent apparatus and a child apparatus, receives the control command from the server via the IP network, performs internal control of the first communication apparatus according to the control command, and sends setup information obtained by the internal control upon a request; and a second communication apparatus that is installed in a second information home appliance different from the first information home appliance and connected to the first communication apparatus as the child apparatus of the parent apparatus, sends the request for the setup information to the first communication apparatus, and controls the second communication apparatus according to the setup information sent from the first communication apparatus; and a third communication apparatus that is installed in a third information home appliance different from the first and second information home appliances and connected to the first communication apparatus as the parent apparatus of the second communication apparatus;

wherein the second communication apparatus transmits search signals used for searching for the first communication apparatus and the third communication apparatus, the third communication apparatus transmits a search signal used for searching for the first communication apparatus, the first communication apparatus determines whether the third communication apparatus is controllable, based on an attribute included in the search signal transmitted by the third communication apparatus in order to search for the first communication apparatus, and transmits a response signal in response to the search signal transmitted by the third communication apparatus in a case of determining that the first communication apparatus is able to control the third communication apparatus, and the third communication apparatus includes a search signal generating unit configured to generate and broadcast the search signal used for searching for the first communication apparatus, a connection request signal generating unit configured to generate, based on the response signal, a connection request to be issued to the first communication apparatus, a determining unit configured to determine whether the first communication apparatus is able to control the second communication apparatus by comparing an attribute included in the search signal transmitted from the second communication apparatus with an attribute of the first communication apparatus, a search-signal response signal generating unit configured to generate and transmit a response signal in response to the search signal transmitted by the second communication apparatus to the second communication apparatus in a case where the third communication apparatus is determined to be able to control the second communication apparatus, and a registering unit configured to register the second communication apparatus as a control target based on a connection request issued by the second communication apparatus after receiving the response signal.

2. The communication system as claimed in claim 1, wherein the operation system transmits a control command to the first communication apparatus in order to control the first communication apparatus, the first communication apparatus stores the control command, and the third communication apparatus includes a control information request signal generating unit configured to request the first communication apparatus for control information, a storing unit configured to store the control command transmitted by the first communication apparatus, and a control command communication unit configured to report the control command stored in the storing unit in response to a control information request made by the second communication apparatus.

3. The communication system as claimed in claim 1, wherein the second communication apparatus is connected to the first communication apparatus only through the parent apparatus.

4. The communication system as claimed in claim 1, wherein the attribute is any one of an apparatus type, a manufacturer's name, a maker's name, a model number, a version and a serial number.

5. The communication system as claimed in claim 1, wherein if the first communication apparatus transmits the response signal in response to the search signal transmitted by the third communication apparatus in the case of determining that the first communication apparatus is able to control the third communication apparatus, the first communication apparatus reports information of the third communication apparatus to the server, and the third communication apparatus reports information of the second communication apparatus, which is registered by the registering unit of the third communication apparatus as the control target, to the server.

* * * * *